United States Patent
Sasaki

(10) Patent No.: US 9,203,057 B2
(45) Date of Patent: Dec. 1, 2015

(54) BATTERY AND METHOD OF MANUFACTURING BATTERY

(75) Inventor: Takeshi Sasaki, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 141 days.

(21) Appl. No.: 13/704,742

(22) PCT Filed: Jun. 29, 2011

(86) PCT No.: PCT/JP2011/064926
§ 371 (c)(1),
(2), (4) Date: Dec. 17, 2012

(87) PCT Pub. No.: WO2012/005153
PCT Pub. Date: Jan. 12, 2012

(65) Prior Publication Data
US 2013/0089766 A1    Apr. 11, 2013

(30) Foreign Application Priority Data
Jul. 3, 2010   (JP) .................................. 2010-152558

(51) Int. Cl.
    *H01M 2/00*      (2006.01)
    *H01M 2/02*      (2006.01)
    (Continued)

(52) U.S. Cl.
CPC .............. *H01M 2/0207* (2013.01); *H01M 2/00* (2013.01); *H01M 2/263* (2013.01); *H01M 10/0431* (2013.01); *Y10T 29/49108* (2015.01)

(58) Field of Classification Search
CPC ........... H01M 2/22; H01M 4/00; H01M 4/82; H01M 2/0207; H01M 2/021; H01M 2/0212; H01M 2/0222

USPC ................. 429/94, 133, 162; 29/623.1–623.5
See application file for complete search history.

(56) References Cited

U.S. PATENT DOCUMENTS

2004/0131935 A1*   7/2004   Munenaga et al. ........... 429/211
2004/0191612 A1*   9/2004   Akita et al. ...................... 429/94
(Continued)

FOREIGN PATENT DOCUMENTS

JP      06-203870      7/1994
JP      11-097055      4/1999
(Continued)

OTHER PUBLICATIONS

English Translation for JP 2000-231913.*
(Continued)

*Primary Examiner* — Patrick Ryan
*Assistant Examiner* — Kiran Quraishi
(74) *Attorney, Agent, or Firm* — Rankin, Hill & Clark LLP

(57) ABSTRACT

The present invention maintains a power generating element in a flat shape as far as possible to thereby improve workability in a manufacturing process. In a battery including a power generating element formed into a flat shape and housed in a container, the power generating element formed by winding a foil-shaped positive electrode plate 24*a* and a foil-shaped negative electrode plate 24*b*, with separator 25 sandwiched therebetween, about a winding core 21 having flexibility, a thin-plate-shaped member TP having higher rigidity than the winding core is attached to at least one of opposite end portions in a direction of a winding axis of the winding core 21.

15 Claims, 8 Drawing Sheets

(51) Int. Cl.
  *H01M 2/26* (2006.01)
  *H01M 10/04* (2006.01)

(56) References Cited

U.S. PATENT DOCUMENTS

2009/0280403 A1* 11/2009 Han et al. .................. 429/164
2010/0146776 A1* 6/2010 Yamauchi et al. ........... 29/623.1

FOREIGN PATENT DOCUMENTS

| JP | 2000-156241 | | 6/2000 | |
| JP | 2000-228182 | | 8/2000 | |
| JP | 2000-231913 | * | 8/2000 | ............. H01M 2/22 |
| JP | 2000-340263 | | 12/2000 | |
| JP | 2001-126751 | | 5/2001 | |
| JP | 2004-178862 | | 6/2004 | |
| JP | 2005-085556 | | 3/2005 | |
| JP | 2007-165115 | | 6/2007 | |

OTHER PUBLICATIONS

English Translation of JP2000-231913.*
International Search Report filed in PCT/JP2011/064926.

* cited by examiner

BATTERY AND METHOD OF MANUFACTURING BATTERY

TECHNICAL FIELD

The present invention relates to a battery in which a power generating element formed by winding a foil-shaped positive electrode plate and a foil-shaped negative electrode plate, with separator sandwiched therebetween, about a winding core having flexibility is formed in a flat shape and housed in a container and relates to a method of manufacturing the battery.

BACKGROUND ART

In the battery, the power generating element is formed by winding the long foil-shaped positive electrode plate and the long foil-shaped negative electrode plate, with the separators sandwiched therebetween, about the winding core to thereby increase areas of the positive and negative plates facing each other to maximize energy density of the battery.

As the power generating element formed by winding the foil-shaped positive electrode plate and the like about the winding core in this manner, in many cases, the foil-shaped positive electrode plate and the like are wound about the circular cylindrical winding core, the power generating element in a circular columnar shape as a whole, in its unchanged shape, is housed into a battery case, and the battery case is also formed in a circular columnar shape adapted to the shape of the power generating element.

On the other hand, as described in the following Patent Document 1, forming a power generating element into a flat shape and also forming a battery case for housing the power generating element into a thin shape are widely practiced.

By the formation of the battery case into the thin shape in this manner, it is possible to efficiently dispose the battery in a small space.

As a manufacturing process of this type of power generating element in the flat shape, the foil-shaped positive electrode plate and the like are wound about the cylindrical winding core and then the wound object is flattened into the flat shape in many cases.

PRIOR ART DOCUMENT

Patent Document

Patent Document 1: JP-A-2000-340263

DISCLOSURE OF THE INVENTION

Problems to be Solved by the Invention

However, the wound object formed by winding the foil-shaped positive electrode plate and the like about the winding core has a certain degree of resiliency and therefore returns from the flat shape in the flattened state to a partway expanded shape. If the power generating element returns to the expanded shape, workability in an assembly process for attaching the power generating element and other members such as current collectors and other work is deteriorated.

The present invention has been made with such circumstances in view and its object is to maintain a power generating element in a flat shape as far as possible to thereby improve workability in a manufacturing process.

Means for Solving the Problems

In accordance with a first aspect of the present application, a battery is provided, the battery including a power generating element formed into a flat shape and housed in a container, the power generating element formed by winding a long foil-shaped positive electrode plate and a long foil-shaped negative electrode plate, with a separator sandwiched therebetween, about a cylindrical winding core having flexibility, wherein a thin-plate-shaped member having higher rigidity than the winding core is attached to at least one of opposite end portions in a direction of a winding axis of the flat winding core.

In other words, in order to suppress expansion of the winding core having the flexibility and positioned at a central portion of the power generating element and after the power generating element is formed into the flat shape, the thin-plate-shaped member having the high rigidity is attached to at least one of the opposite end portions of the winding core formed into the flat shape.

This thin-plate-shaped member has a strong force for maintaining itself in a attached posture and therefore the expansion of the winding core is suppressed even if the thin-plate-shaped member receives external force acting in an expanding direction from the winding core.

In accordance with a second aspect of the present application, in addition to the structure of the above-described first invention, the thin-plate-shaped member having the higher rigidity than the winding core is attached, while bent together with the winding core, at least to a bent portion of at least one of the opposite end portions in the direction of the winding axis of the flat winding core.

In other words, in order to suppress expansion of the winding core having the flexibility and positioned at the central portion of the power generating element after the power generating element is formed into the flat shape, the thin-plate-shaped member having the high rigidity is attached, in the bent posture similarly to the winding core, to at least the bent portion of the flat winding core.

This thin-plate-shaped member has the strong force for maintaining itself in the bent posture and therefore the expansion of the winding core is further suppressed even if the thin-plate-shaped member receives the external force acting in the expanding direction from the winding core.

In accordance with a third aspect of the present invention, in addition to the structure of the above-described first or second invention, a non-coating portion not applied with an active material is formed at one of end portions in a width direction of at least one of the foil-shaped positive electrode plate and the foil-shaped negative electrode plate, the non-coating portion is in the state of protruding in the direction of the winding axis from the separator and is wound about the winding core, and the non-coating portions are bundled and fixed to the thin-plate-shaped members.

In other words, how to lead out electric wiring is a problem when the long foil-shaped electrode plates are wound about the winding core to form the power generating element. One of methods is to carry out the electric wiring by forming the portion not applied with the active material at one of the end portions in the width direction of the foil-shaped electrode plate and bundling the non-coating portions on each circumference.

If the non-coating portion is fixed to the thin-plate-shaped member positioned at the center in bundling the non-coating portions in this manner, it is possible to further reliably maintain the power generating element in the flat shape.

In accordance with a fourth aspect of the present invention, in addition to the structure of the above-described third invention, the thin-plate-shaped members are attached to the opposite end portions in the direction of the winding axis of the winding core, non-coating portion not applied with the active material is formed at one end in the width direction of the foil-shaped positive electrode plate and the foil-shaped negative electrode plate, the non-coating portion of the foil-shaped positive electrode plate and the non-coating portion of the foil-shaped negative electrode plate are in the state of protruding from opposite sides in the direction of the winding axis and are wound about the winding core, and the non-coating portion of the foil-shaped positive electrode plate and the non-coating portion of the foil-shaped negative electrode plate are fixed to the separate thin-plate-shaped members.

In other words, the non-coating portion of the foil-shaped positive electrode plate and the non-coating portion of the foil-shaped negative electrode plate are allocated to the opposite portions in the direction of the winding axis and the non-coating portions are bundled and fixed to the thin-plate-shaped members at the opposite end portions in the direction of the winding axis.

As a result, it is possible to further reliably maintain the power generating element in the flat shape.

In accordance with a fifth aspect of the present application, in addition to the structure of any one of the above-described first to fourth inventions, the thin-plate-shaped member is attached without protruding in a direction of a normal to an outer peripheral face of the winding core from the outer peripheral face.

In other words, in order to secure required rigidity, a relatively thick member as compared with the winding core and the like is employed as the thin-plate-shaped member.

If such a thick member is provided to form a step on the outer peripheral face of the winding core, wound positions on each circumference may be slightly shifted to cause winding deviation when the foil-shaped positive electrode plate and the like are wound about the winding core. However, if the step of the thin-plate-shaped member does not directly appear on the outer peripheral face of the winding core as described above, wound postures of the foil-shaped positive electrode plate and the like are stabilized.

In accordance with a sixth aspect of the present invention, in addition to the structure of the third or fourth invention, further includes a current collector for electrically connecting an electrode terminal disposed outside the container and the power generating element, wherein the current collector, the non-coating portion, and the thin-plate-shaped member are fixed while the non-coating portion is sandwiched between the current collector and the thin-plate-shaped member.

In other words, the current collector is provided for electrically connecting the power generating element and the electrode terminal disposed outside the container of the battery.

If the above-described thin-plate-shaped member is not provided, the current collector and the power generating element are connected by carefully inserting the current collector into a gap in the non-coating portion so as not to damage the non-coating portion of the power generating element, bundling the non-coating portions and the current collector together, and fixing the non-coating portion and the current collector by welding, for example, which requires troublesome work.

On the other hand, if the fixing operation is carried out while the non-coating portion is sandwiched between the thin-plate-shaped member and the current collector, the current collector is disposed outside the layers of the non-coating portion, which makes the fixing operation easy.

In accordance with a seventh aspect of the present invention, in addition to the structure of the above-described sixth invention, the non-coating portion is fixed to the thin-plate-shaped member while pinching the thin-plate-shaped member from opposite sides of the thin-plate-shaped member, and the current collector is attached to only one side of the non-coating portion pinching the thin-plate-shaped member from the opposite sides.

In other words, if the above-described thin-plate-shaped member is not provided, a tip end portion of the current collector and to be connected to the non-coating portion needs to be divided into a plurality of portions and the plurality portions need to be inserted between the layers of the non-coating portion so as to further reliably connect the current collector and the non-coating portion, which complicates the connecting work.

On the other hand, if the non-coating portions are bundled and fixed to the thin-plate-shaped member, the current collector and the non-coating portion need to be connected to each other at only one position.

In accordance with an eighth aspect of the present invention, in addition to the structure of any one of the above-described first to seventh inventions, the thin-plate-shaped member is formed into a ring shape so as to be attached along an entire circumference of the end portion in the direction of the winding axis of the cylindrical winding core.

In other words, it is effective to dispose the thin-plate-shaped member only around the bent portion of the winding core in order to maintain the flat shape of the power generating element. However, if the thin-plate-shaped member is provided to the entire circumference of the end portion in the direction of the winding axis, it increases the effect of maintaining the power generating element in the flat shape. Moreover, it is unnecessary to consider which positions in a circumferential direction should be bent in forming the power generating element into the flat shape, which further improves workability.

In accordance with a ninth aspect of the present invention, a method of manufacturing a battery is provided, the battery including a power generating element formed into a flat shape and housed in a container, the power generating element formed by winding a long foil-shaped positive electrode plate and a long foil-shaped negative electrode plate, with a separator sandwiched therebetween, about a cylindrical winding core having flexibility, the method including: a winding core forming step for attaching a thin-plate-shaped member having higher rigidity than the winding core to at least one of opposite end portions in a direction of a winding axis of the winding core; an electrode plate winding step for winding the long foil-shaped positive electrode plate and the long foil-shaped negative electrode plate, with the separator sandwiched therebetween, about the winding core attached with the thin-plate-shaped member; and a pressing step for pressing the foil-shaped positive electrode plate and the foil-shaped negative electrode plate, which are wound about the winding core, in a direction orthogonal to the direction of the winding axis into a flat shape.

In other words, in forming the power generating element into the flat shape in the above-described pressing step, the thin-plate-shaped member attached to the winding core in the above-described winding core forming step is pressed together with the winding core. The thin-plate-shaped member has a strong force for maintaining itself in the pressed posture and therefore the expansion of the winding core is suppressed even if the thin-plate-shaped member receives an external force acting in an expanding direction from the winding core after the power generating element is formed into the flat shape.

In accordance with a tenth aspect of the present invention, in addition to the structure of the above-described ninth invention, the foil-shaped positive electrode plate and the foil-shaped negative electrode plate, which are wound about the winding core, is pressed in the direction orthogonal to the direction of the winding axis into the flat shape with the thin-plate-shaped member existing at least at a bent portion in the pressing step.

In other words, in forming the power generating element into the flat shape in the above-described pressing step, the thin-plate-shaped member attached to the winding core in the above-described winding core forming step is pressed and bent together with the winding core. As a result, the thin-plate-shaped member has a strong force for maintaining itself in the bent posture and therefore the expansion of the winding core is suppressed even if the thin-plate-shaped member receives an external force acting in an expanding direction from the winding core after the power generating element is formed into the flat shape.

In accordance with an eleventh aspect of the present invention, in addition to the structure of the above-described tenth invention, the thin-plate-shaped member is attached to the winding core without protruding in a direction of a normal to an outer peripheral face of the winding core from the outer peripheral face in the winding core forming step.

As a result, in the plate winding step, the step of the thin-plate-shaped member does not directly appear on the outer peripheral face of the winding core and therefore it is possible to wind the foil-shaped positive electrode plate and the like while suppressing the winding deviation as far as possible.

Advantages of the Invention

According to the first invention, the thin-plate-shaped member attached to the winding core has the strong force for maintaining itself in the attached posture and therefore the expansion of the winding core is suppressed even if the thin-plate-shaped member receives the external force acting in the expanding direction from the winding core. As a result, it is possible to maintain the power generating element in the flat shape as far as possible to thereby improve workability in the manufacturing process.

According to the second invention, the thin-plate-shaped member attached to the winding core and in the bent posture has the strong force for maintaining itself in the bent posture and therefore the expansion of the winding core is suppressed even if the thin-plate-shaped member receives the external force acting in the expanding direction from the winding core. Accordingly, it is possible to maintain the power generating element in the flat shape as far as possible to thereby further improve workability in the manufacturing process.

According to the third invention, by bundling the non-coating portions and fixing them to the thin-plate-shaped member, it is possible to further reliably maintain the power generating element in the flat shape to thereby further improve the workability.

According to the fourth invention, because the non-coating portions are bundled and fixed to the thin-plate-shaped members at the opposite end portions in the direction of the winding axis, it is possible to further reliably maintain the power generating element in the flat shape.

According to the fifth invention, because the step of the thin-plate-shaped member does not directly appear on the outer peripheral face of the winding core to thereby stabilize the wound postures of the foil-shaped positive electrode plate and the like, it is possible to stably form the power generating element into a desired outer shape.

According to the sixth invention, because the fixing work is carried out while the non-coating portion is sandwiched between the thin-plate-shaped member and the current collector, the current collector is disposed outside the layers of the non-coating portion, which makes the fixing operation easy and further increases efficiency in the assembly work of the battery.

According to the seventh invention, by bundling the non-coating portions and fixing them to the thin-plate-shaped member, the current collector and the non-coating portion need to be connected to each other at only one position, which further increases efficiency in the assembly work of the battery.

According to the eighth invention, by providing the thin-plate-shaped member to the entire circumference of the end portion in the direction of the winding axis, the effect of maintaining the power generating element in the flat shape is exerted more reliably. Moreover, it is unnecessary to consider which positions in the circumferential direction should be bent in forming the power generating element into the flat shape, which further improves workability in the assembly of the power generating element.

According to the ninth invention, in forming the power generating element into the flat shape in the assembly step of the power generating element which is a part of the assembly process of the battery, the thin-plate-shaped member attached to the winding core is pressed together with the winding core. The thin-plate-shaped member has the strong force for maintaining itself in the pressed posture and therefore the expansion of the winding core is suppressed even if the thin-plate-shaped member receives the external force acting in the expanding direction from the winding core.

According to the tenth invention, in forming the power generating element into the flat shape in the assembly step of the power generating element which is the part of the assembly process of the battery, the thin-plate-shaped member attached to the winding core is pressed and bent together with the winding core. As a result, the thin-plate-shaped member in the bent posture has the strong force for maintaining itself in the bent posture due to its high rigidity and therefore the expansion of the winding core is suppressed even if the thin-plate-shaped member in the bent posture receives the external force acting in the expanding direction from the winding core.

Accordingly, it is possible to maintain the power generating element in the flat shape as far as possible to thereby improve workability in the manufacturing process.

According to the eleventh invention, the step of the thin-plate-shaped member does not directly appear on the outer peripheral face of the winding core and therefore it is possible to wind the foil-shaped positive electrode plate and the like while suppressing the winding deviation as far as possible to thereby smoothly carry out the assembly work of the power generating element.

MODE FOR CARRYING OUT THE INVENTION

An embodiment of a battery according to the present invention will be described below based on the drawings.

Although a nonaqueous electrolyte secondary battery (more specifically, a lithium ion battery) will be described as an example in the embodiment, the invention can be applied to secondary batteries other than the nonaqueous electrolyte secondary battery and primary batteries as well.

Structure of Nonaqueous Electrolyte Secondary Battery

Figure 1:
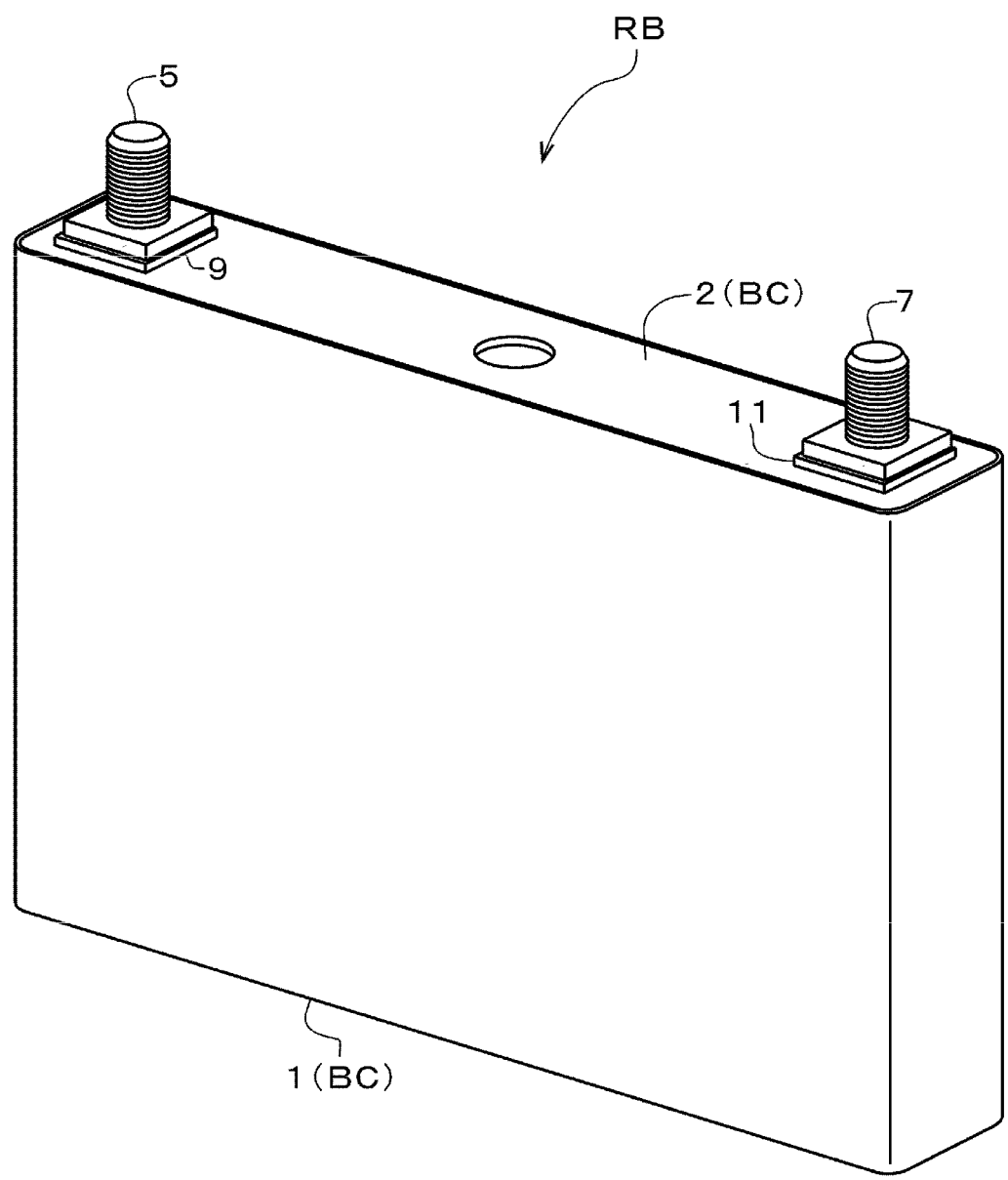
FIG. 1 is an external perspective view of a battery according to an embodiment of the present invention.
Figure 2:
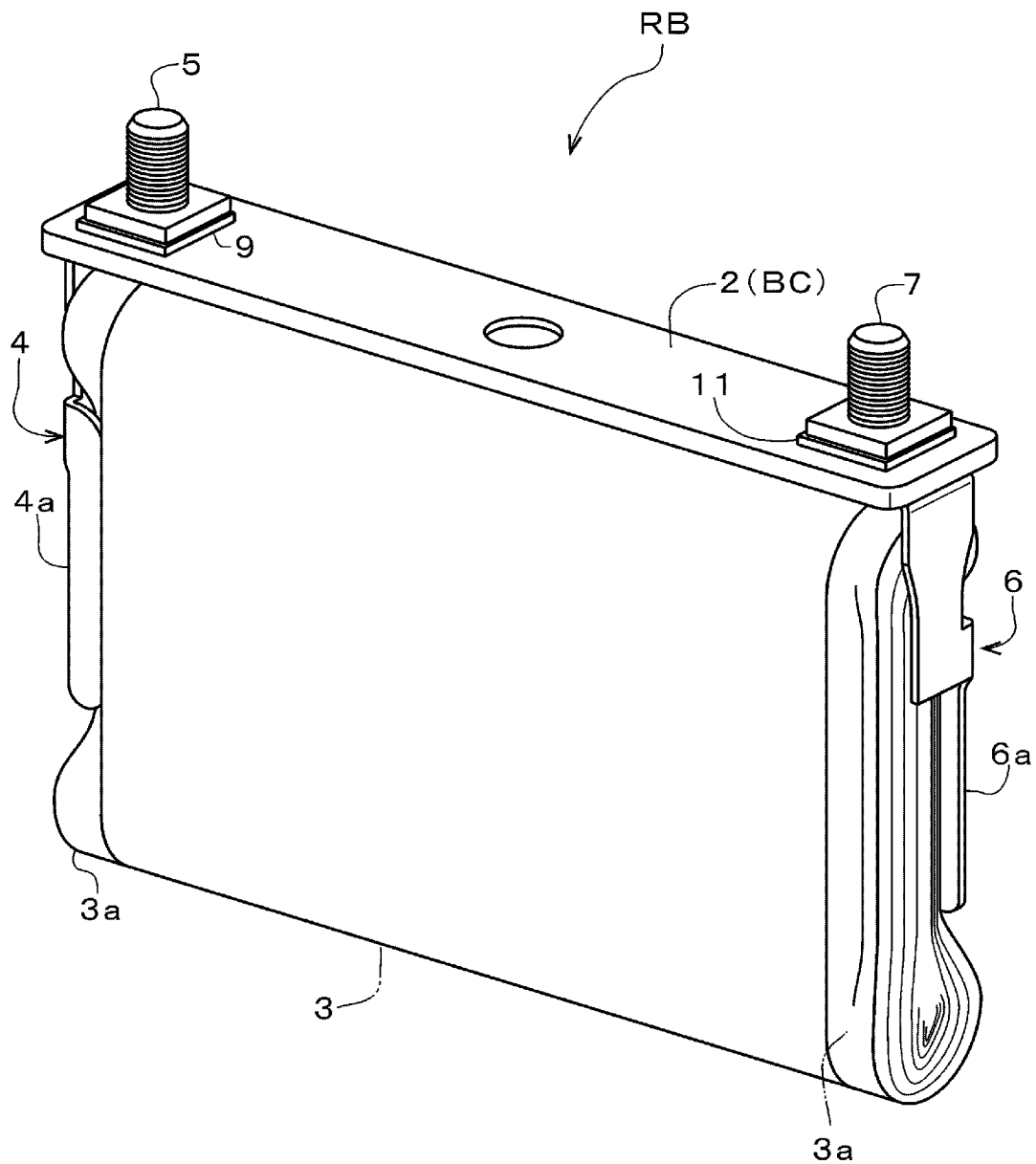
FIG. 2 is a perspective view of an inner structure of the battery according to the embodiment of the invention.
Figure 3:
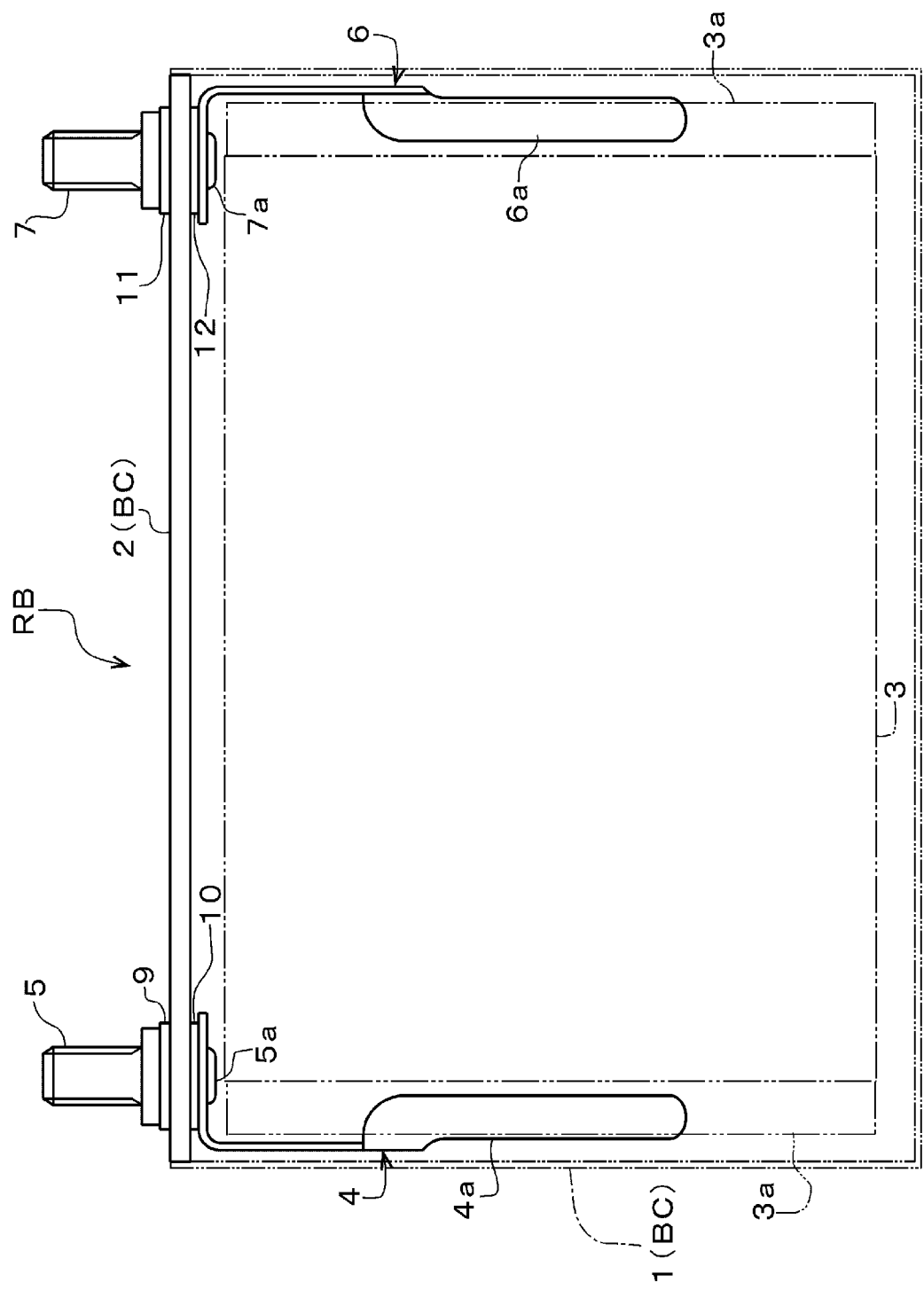
FIG. 3 is a front view of an inner structure of the battery according to the embodiment of the invention.

As shown in perspective views in FIGS. 1 and 2 and a front view in FIG. 3, the nonaqueous electrolyte secondary battery RB in the present embodiment has a case BC formed by placing and welding a lid portion 2 substantially in a shape of a flat plate onto an open face of a can body 1 in a cylindrical shape with a bottom (more specifically, a rectangular cylindrical shape with a bottom). The lid portion 2 is formed into a strip-shaped rectangle and the case BC has a shape of a flat rectangular parallelepiped in its entirety. FIG. 2 shows an inner structure of the case BC by removing the can body 1 from the completed secondary battery RB (shown in FIG. 1). In FIG. 3, the can body 1 and a power generating element 3 (described later) are shown by two-dot chain lines so that an inside of the case BC can be seen through them.

In the case BC, the power generating element 3 and current collectors 4 and 6 shown in FIGS. 2 and 3 are housed while immersed in an electrolyte solution. Therefore, the case BC serves as a container for housing the power generating element 3.

As will be described later in detail below, the power generating element 3 is formed by applying an active material each on a pair of electrode plates including a foil-shaped positive electrode plate and a foil-shaped negative electrode plate and winding the electrode plates with separators sandwiched therebetween.

The power generating element 3 has a portion of the foil-shaped positive electrode plate, not applied with the active material, and extending out from a side to be welded to the current collector 4 and a portion of the foil-shaped negative electrode plate, not applied with the active material, and extending out from an opposite side to be welded to the current collector 6.

To the lid portion 2 made of metal (specifically, aluminum), the current collector 4 on a positive side and a terminal bolt 5 serving as a positive electrode terminal connected to the current collector 4, and the current collector 6 on a negative side and a terminal bolt 7 serving as a negative electrode terminal connected to the current collector 6 are attached, and the current collectors 4 and 6 electrically connect the electrode terminals disposed outside the case BC and the power generating element 3.

The terminal bolt 5 is attached and fixed to the lid portion 2 by pinching two pieces of packing 9 and 10, disposed to sandwich the lid portion 2, between a head portion of the terminal bolt 5 and the current collector 4 and caulking a rivet 5a formed at the head portion of the terminal bolt 5.

The negative side has a similar structure and the terminal bolt 7 is fixed to the lid portion by pinching two pieces of packing 11 and 12, disposed to sandwich the lid portion 2, between a head portion of the terminal bolt 7 and the current collector 6 and caulking a rivet 7a formed at the head portion of the terminal bolt 7 (see FIG. 3).

The negative-side electrode structure and the positive-side electrode structure including the terminal bolts 5 and 7 and the current collectors 4 and 6 are the same as each other and disposed symmetrically and the structures are different only in material of the metal members.

The metal members on the positive side are made of aluminum and the metal members on the negative side are made of copper.

[Manufacturing Process of Secondary Battery]

Next, a manufacturing process of the secondary battery RB will be described briefly.

First, assembly of the power generating element 3 will be described.

Figure 5:
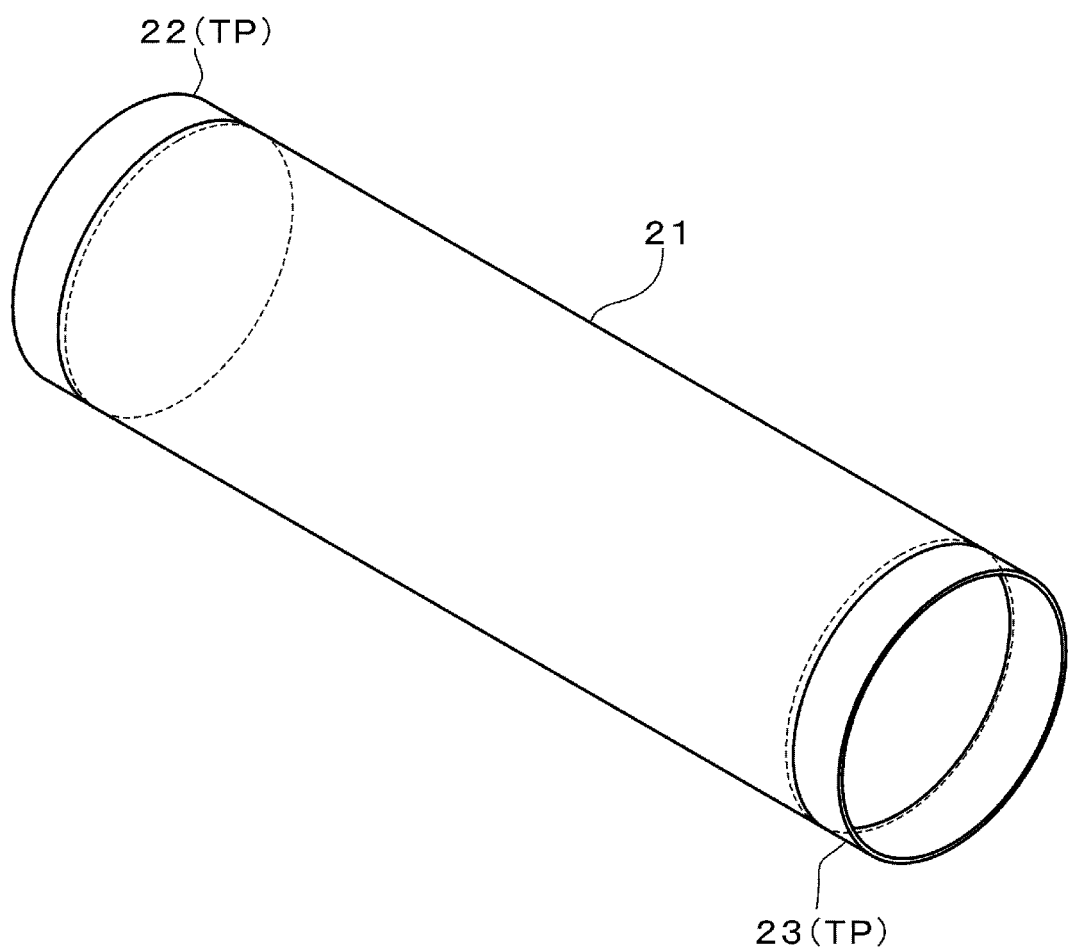
FIG. 5 is a perspective view of the winding core according to the embodiment of the invention.

The power generating element 3 is produced by applying a positive active material and a negative active material on front and back opposite faces of long band-shaped aluminum foil and copper foil, respectively, to form active material layers, and winding the foil-shaped positive electrode plate and the foil-shaped negative electrode plate having the active material layers about a winding core 21 shown in FIG. 5, with the separators sandwiched therebetween. Orientations in winding are such that longitudinal sides of the foil-shaped positive electrode plate and the like are wound about the winding core 21.

[Winding Core Forming Step]

The winding core 21 is made of an electrically insulating material resistant to the electrolyte solution. To put it concretely, resin such as PPS (polyphenylene sulfide), PP (polypropylene), PET, PE (polyethylene), and PVDF (polyvinylidene fluoride) may be used and PPS is preferable from a viewpoint of heat resistance.

The winding core 21 is in a circular cylindrical shape and formed by preparing a rectangular sheet-shaped member having flexibility by using the above-described material, winding the member into the circular cylindrical shape, and fixing end edges to each other by thermal adhesion or by using tape. An axis of this circular cylindrical shape serves as a winding axis in winding the foil-shaped positive electrode plate 24a and the like.

Furthermore, current collecting rings 22 and 23 which are thin-plate-shaped members TP made of metal are attached to opposite end portions in an axial direction of the winding core 21.

Figure 4:
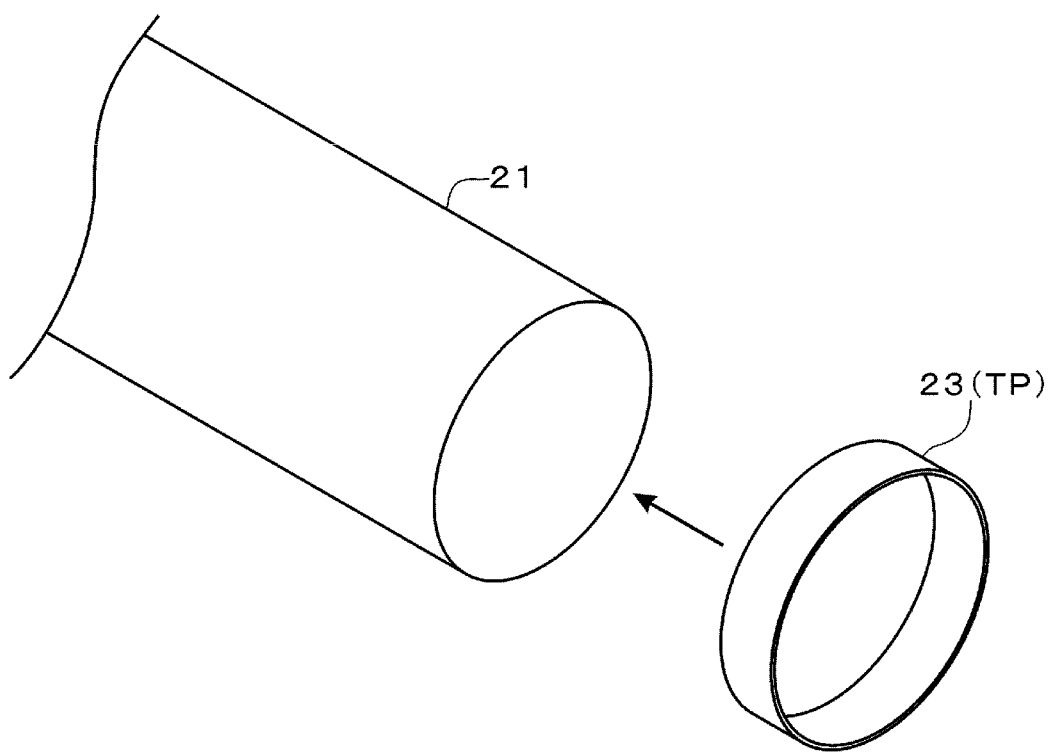
FIG. 4 is a perspective view showing assembly of a winding core according to the embodiment of the invention.

The current collecting rings 22 and 23 mounted to the axial opposite end portions have the same shapes and are in circular cylindrical shapes having small widths in the axial direction as shown in FIG. 4. By forming the thin-plate-shaped members TP into ring shapes, the thin-plate-shaped members TP are mounted along entire circumferences of end portions in the axial direction of the cylindrical winding core 21.

Dimensions of outer shapes of the current collecting rings 22 and 23 are substantially the same as a dimension of an inner diameter of the circular cylindrical winding core and the current collecting rings 22 and 23 and the winding core 21 are mounted to each other by fitting small parts of axial end portions of the current collecting rings 22 and 23 into the winding core 21 and fixing the portions of the winding core 21 and the current collecting rings 22 and 23 overlapping to each other as shown in FIGS. 4 and 5 showing states before and after the mounting. Although this fixing is carried out by thermal adhesion, the fixing may be carried out by using a tape adhesive or by pressing.

By fitting the end portions of the current collecting rings 22 and 23 into the circular cylindrical winding core 21 in this manner, the current collecting rings 22 and 23 are mounted without extending from an outer peripheral face of the winding core 21 in a direction of a normal to the outer peripheral face.

In this way, steps formed by mounting the current collecting rings 22 and 23 do not directly appear on the outer peripheral face of the winding core 21 and it is possible to suppress instability caused by the current collecting rings 22 and 23 of wound positions of the foil-shaped positive electrode plate 24a and the like on the outer peripheral face of the winding core 21.

One of materials of the two current collecting rings 22 and 23 is aluminum and the other is copper, which corresponds to materials forming the foil-shaped positive electrode plate, the foil-shaped negative electrode plate, and the like.

[Plate Winding Step]

Figure 7:
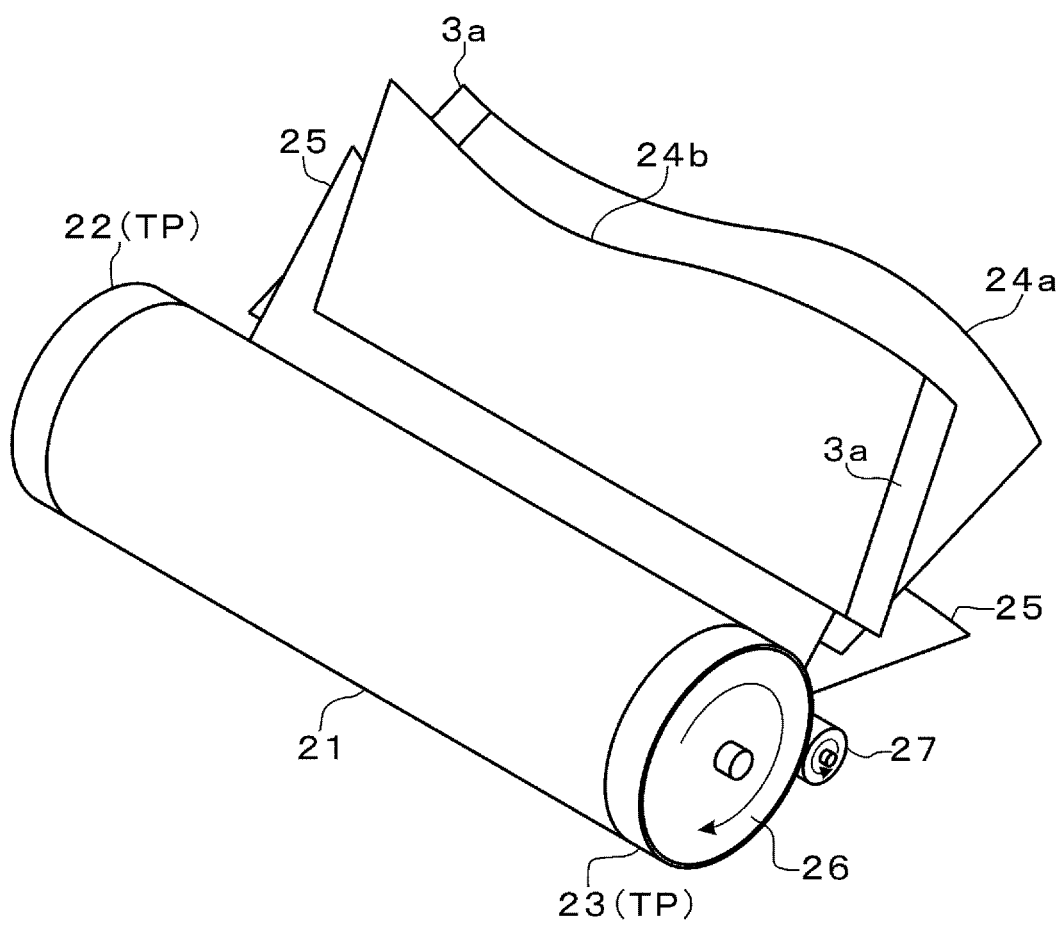
FIG. 7 is a perspective view showing a form of winding of the electrode plates and the like about the winding core according to the embodiment of the invention.

A step of winding the foil-shaped positive electrode plate 24a, the foil-shaped negative electrode plate 24b, and the separators 25 about the winding core 21 in the above-described shape is carried out as schematically shown in FIG. 7.

FIG. 7 schematically shows a manner in which a winding roller 26 is passed through a hollow portion in the winding core 21 and the foil-shaped positive electrode plate 24a, the foil-shaped negative electrode plate 24b, and the separators 25 are fed between the winding roller 26 and a pressing roller 27 pressed against an outer peripheral face of the winding roller 26 and are wound. The winding about the winding core 21 is carried out by layering the foil-shaped negative electrode plate 24b, the separator 25, the foil-shaped positive electrode plate 24a, and the separator 25 in this order from an inner periphery side and winding them. Longitudinal end portions (end portions on a winding starting side) of the two separators 25 are fixed to the outer periphery of the winding core 21 by using tape or by thermal adhesion.

At a winding starting position shown in FIG. 7, the winding is started while sandwiching the foil-shaped negative electrode plate 24b between the winding core 21 and the separator 25 and the foil-shaped positive electrode plate 24a between the two separators 25.

Figure 6:
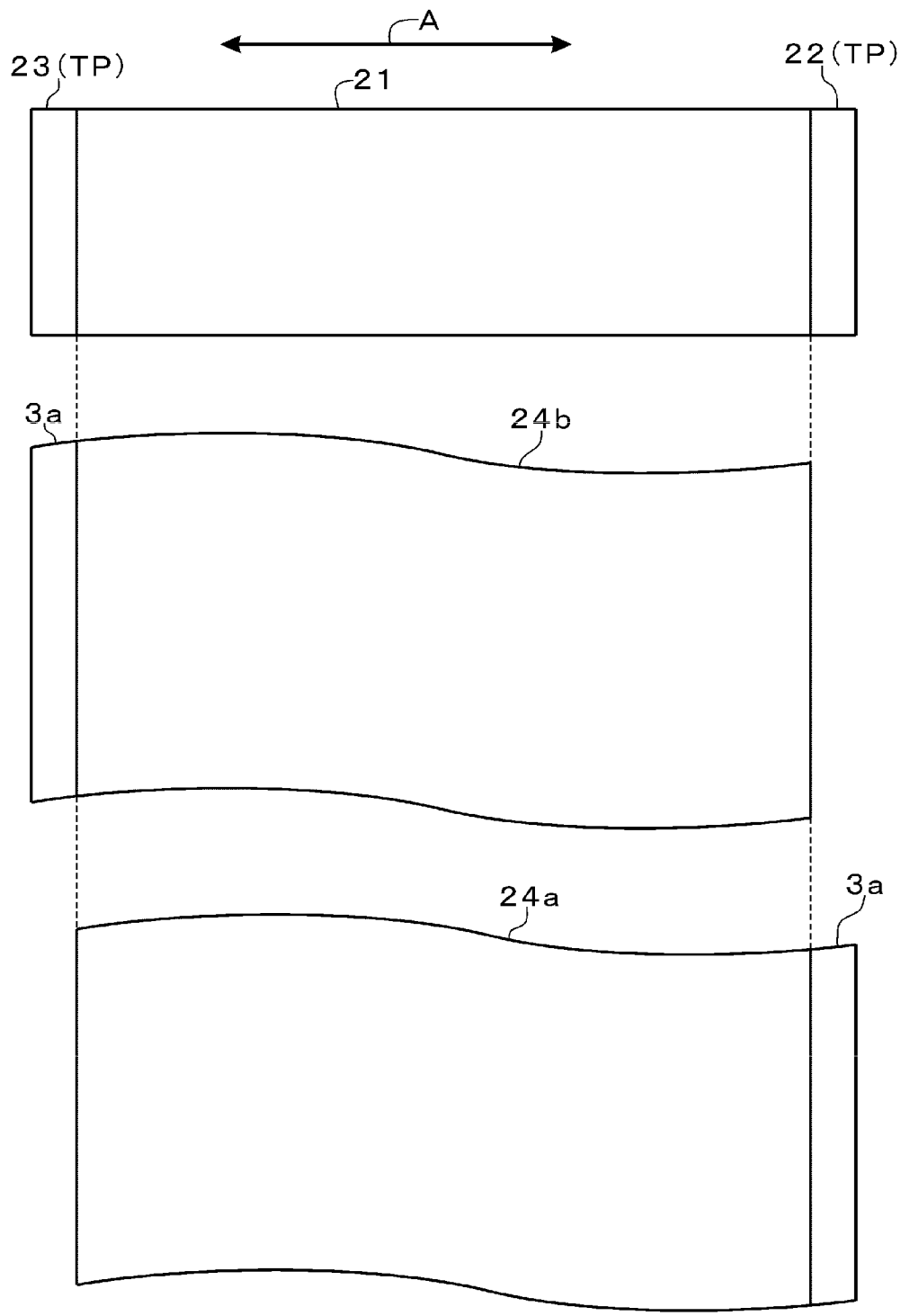
FIG. 6 is a drawing showing positional relationships between the winding core and plates according to the embodiment of the invention.

Positional relationships in the axial direction in winding the foil-shaped positive electrode plate 24a and the like about the winding core 21 are set as shown in FIG. 6. In FIG. 6, the winding core 21 in a state where the current collecting rings 22 and 23 are mounted is shown as a basis on an upper part, the positional relationships of the foil-shaped negative electrode plate 24b and the foil-shaped positive electrode plate 24a in the axial direction of the winding core 21 (a direction of an arrow A) are shown on an intermediate part (the foil-shaped negative electrode plate 24b) and a lower part (the foil-shaped positive electrode plate 24a).

The foil-shaped negative electrode plate 24b has the non-coating portion 3a not applied with the active material at one of its end portions in a width direction (short width direction) and the non-coating portion 3a is set to overlap the position of the current collecting ring 23.

The foil-shaped positive electrode plate 24a similarly has the non-coating portion 3a not applied with the active material at one of its end portions in a width direction (width direction on a short width side) and the non-coating portion 3a is set to overlap the position of the current collecting ring 22. In other words, the non-coating portions 3a of the foil-shaped positive electrode plate 24a and the foil-shaped negative electrode plate 24b are set on opposite sides from each other in the width direction.

Although not shown in the drawings, each of the two separators 25 is set at a position substantially aligned with widths of portions of the foil-shaped positive electrode plate 24a and the foil-shaped negative electrode plate 24b excluding the non-coating portions 3a (i.e., portions applied with the active material). More specifically, the widths of the separators 25 are set to be slightly greater than the entire widths applied with the active material.

Therefore, both of the non-coating portions 3a of the foil-shaped positive electrode plate 24a and the foil-shaped negative electrode plate 24b are wound while protruding in the axial direction of the winding core 21 (i.e., a direction of a winding axis) from the separators 25 and the non-coating portion 3a of the foil-shaped positive electrode plate 24a and the non-coating portion 3a of the foil-shaped negative electrode plate 24b protrude from opposite sides of the separators 25 from each other in the direction of the winding axis.

As a result, on each of the positive side and the negative side, mutual electrical connection is achieved when the non-coating portion 3a is bundled and fixed as described later.

[Pressing Step]

After the predetermined lengths of foil-shaped positive electrode plate 24a and the like are wound in the form shown in FIG. 7, they are detached from the winding roller 26 and formed into the flat shape by pressing in the direction of the normal to the outer peripheral face (the direction orthogonal to the direction of the winding axis) to be the flat power generating element 3.

Figure 8:
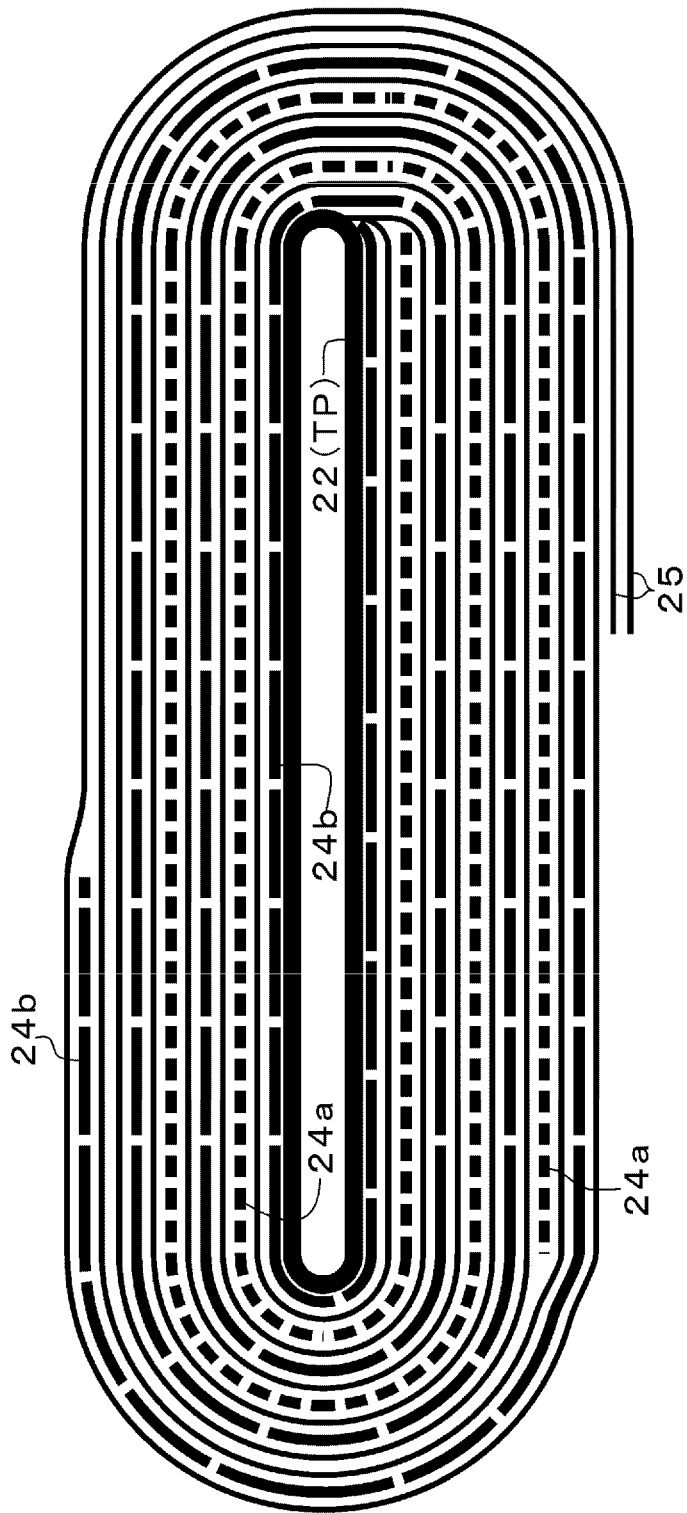
FIG. 8 is a schematic diagram showing the form of winding of the electrode plates and the like about the winding core according to the embodiment of the invention.

FIG. 8 schematically shows, in the axial direction of the winding core 21, a manner in which the foil-shaped positive electrode plate 24a and the like are wound about the winding core 21 in the flat shape.

As schematically shown in FIG. 8, when the foil-shaped positive electrode plate 24a and the like wound about the winding core 21 are flattened into the flat shape, the current collecting rings 22 and 23 are also formed into thin flattened shapes.

Therefore, portions of the current collecting rings 22 and 23 exist in areas where the winding core 21 and the foil-shaped positive electrode plate 24a and the like are bent and the portions of the current collecting rings 22 and 23 are bent together with the winding core 21.

The current collecting rings 22 and 23 are the thin metal plates as described above and are members having higher rigidity than the winding core 21 and having so-called higher hardness than the winding core 21.

Therefore, if the current collecting rings 22 and 23 are flattened into the shapes as shown in FIG. 8, they have strong forces for retaining the flattened shapes even if an external force is applied thereto.

Therefore, when the winding core 21, the foil-shaped positive electrode plate 24a, and the like try to return from the flattened states to their original shapes and their forces act on the current collecting rings 22 and 23, the current collecting rings 22 and 23 suppress the movements in expanding directions and maintain the flattened shapes.

To impart such functions to the current collecting rings 22 and 23, the current collecting rings 22 and 23 are formed by metal plates having a thickness of about 0.2 mm to 0.5 mm.

The functions of maintaining the flat shapes performed by the current collecting rings 22 and 23 are the most effectively performed at bent portions of the current collecting rings 22 and 23 which are flattened into the flat shapes similarly to the entire power generating element 3. It is important to attach the thin-plate-shaped member such as the current collecting rings 22 and 23, which has higher rigidity than the winding core 21 and which is bent together with the winding core 21, to at least any one of the bent portions.

[Case Assembly Step]

Next, assembly of the lid portion 2 will be described. The lid portion 2 is formed by forming electrode attaching holes for attaching the terminal bolts 5 and 7 in an aluminum plate member, and the current collectors 4 and 6 and the terminal bolts 5 and 7 are fixed to the lid portion 2, with pieces of packing 9, 10, 11, and 12 interposed therebetween, by caulking the rivets 5a and 7a.

Next, by welding and connecting the non-coating portions 3a of the power generating element 3 to the current collectors 4 and 6 fixed to the lid portion 2 as described above, the lid portion 2 and the power generating element 3 are integrated with each other.

As shown in FIG. 3, the current collectors 4 and 6 are substantially formed into L shapes as a whole and connection portions 4a and 6a to be connected to the power generating element 3 are bent to be substantially parallel to flat faces of the case BC and the power generating element 3 when each of the portions are assembled.

In welding the connection portions 4a and 6a of the current collectors 4 and 6 and the non-coating portions 3a of the power generating element 3 to each other, on the positive side, ultrasonic welding is carried out after positioning each of the members in a state in which the non-coating portion 3a of the power generating element 3 is bundled about the current collecting ring 22 and the connection portion 4a of the current collector 4 is pushed against the non-coating portion 3a from outside.

On the negative side, similarly, ultrasonic welding is carried out after positioning each of the members in a state in which the non-coating portion 3a of the power generating element 3 is bundled about the current collecting ring 23 and the connection portion 6a of the current collector 6 is pushed against the non-coating portion 3a from outside.

As a result, the current collectors 4 and 6, the non-coating portions 3a, and the current collecting rings 22 and 23 are fixed to each other in positional relationships in which the non-coating portions 3a are sandwiched between the current collectors 4 and 6 and the current collecting rings 22 and 23, the current collecting rings 22 and 23 positioned at centers are pinched by the non-coating portions 3a from opposite sides, and the connection portions 4a and 6a of the current collectors 4 and 6 are attached to only one sides of the non-coating portions 3a pinching the current collecting rings 22 and 23 from the opposite sides.

As a result of the connection and fixing, the non-coating portion 3a of the foil-shaped positive electrode plate 24a, the current collecting ring 22, and the current collector 4 are connected electrically and the non-coating portion 3a of the foil-shaped negative electrode plate 24b, the current collecting ring 23, and the current collector 6 are connected electrically.

After attaching the members on the side of the lid portion 2 and the power generating element 3 to each other in the above-described manner, the power generating element 3 is housed into the can body 1 and the lid portion 2 and the can body 1 are welded to each other.

This completes the assembly of the case BC of the secondary battery RB.

After the assembly of the case BC is completed, the electrolyte solution is then injected into the case BC through an electrolyte solution filling inlet (not shown). When the injection of the electrolyte solution is completed, initial charge (preliminary charge) of the secondary battery RB is carried out under predetermined charge conditions and aging and the like are further carried out to complete the secondary battery RB.

Other Embodiments

Other embodiments of the invention will be listed below.

(1) Although the current collecting rings 22 and 23 are fitted and attached into the cylindrical (circular cylindrical) winding core 21 in order to provide the current collecting rings 22 and 23 to the axial opposite end portions of the cylindrical winding core 21 in the above-described embodiment, the circular cylindrical winding core 21 and the current collecting rings 22 and 23 may be attached to each other by integrally forming them by what is called insert molding.

(2) Although the thin-plate-shaped members TP are attached along the entire circumferences of the axial end portions of the winding core 21 by fitting the current collecting rings 22 and 23 into the axial end portions of the winding core 21 in the above-described embodiment, the thin-plate-shaped members TP may be attached to portions of the axial end portions of the winding core 21 and the winding core 21 may be pressed into the flat shape so that the portions attached with the thin-plate-shaped members TP are bent in the above-described pressing step.

(3) Although the current collecting rings 22 and 23 are attached to the axial opposite end portions of the winding core 21 in the above-described embodiment, the current collecting ring may be attached to either one of the end portions.

In this case, the non-coating portion 3a may be provided to one of the foil-shaped positive electrode plate 24a and the foil-shaped negative electrode plate 24b.

(4) Although the above-described embodiment illustrates the case in which the current collecting ring 22 fixed to the non-coating portion 3a of the foil-shaped positive electrode plate 24a is made of aluminum and the current collecting ring 23 fixed to the non-coating portion 3a of the foil-shaped negative electrode plate 24b is made of copper, the current collecting ring 22 fixed to the non-coating portion 3a of the foil-shaped positive electrode plate 24a may be made of aluminum alloy and the current collecting ring 23 fixed to the non-coating portion 3a of the foil-shaped negative electrode plate 24b may be made of copper alloy.

DESCRIPTION OF REFERENCE SIGNS 3 power generating element
3a non-coating portion
4, 6 current collector
21 winding core
24a foil-shaped positive electrode plate
24b foil-shaped negative electrode plate
25 separator
BC case
TP thin-plate-shaped member

The invention claimed is:
1. A battery comprising:
a power generating element having a flattened shape and housed in a container, the power generating element comprising a positive electrode plate and a negative electrode plate, which are wound with a separator sandwiched therebetween, and a winding core about which the positive and negative electrode plates and the separator are wound, the winding core having flexibility and having a flattened shape;

a thin-plate-shaped member having higher rigidity than the winding core; and a current collector disposed outside the power generating element, the current collector comprising a first plate and a second plate, a cross-section of the first and second plates, taken along a winding axis of the winding core, being an L-shape, the current collector further comprising a connection plate which is perpendicularly attached to the second plate, the first plate being attached to an electrode terminal, the connection plate being attached to the power generating element, wherein the winding core includes, in its sectional view cut along a line perpendicular to the winding axis of the winding core, a flat portion and bent portions, and the thin-plate-shaped member is attached to at least one of opposite end portions in a direction of the winding axis of the winding core such that the thin-plate-shaped member is attached at least to the bent portion, the thin-plate-shaped member includes, in its sectional view cut along the line perpendicular to the winding axis of the winding core, a flat portion and bent portions, the flat portion of the thin-plate-shaped member being disposed in parallel to the flat portion of the power generating element and the connection plate of the current collector, and a portion of the flat portion of the power generating element is sandwiched between the connection plate of the current collector and the flat portion of the thin-plate-shaped member.

2. The battery according to claim 1, wherein the thin-plate-shaped member is bent together with the winding core.

3. The battery according to claim 1, wherein a non-coating portion not applied with an active material is formed at one of end portions in a width direction of at least one of the positive electrode plate and the negative electrode plate, the non-coating portion is in the state of protruding in the direction of the winding axis from the separator and is wound about the winding core, and the non-coating portions are bundled and fixed to the thin-plate-shaped member.

4. The battery according to claim 3, wherein the thin-plate-shaped members are attached to the opposite end portions in the direction of the winding axis of the winding core, the non-coating portions are formed at one end in the width direction of the positive electrode plate and the negative electrode plate, the non-coating portion of the positive electrode plate and the non-coating portion of the negative electrode plate are in the state of protruding from opposite sides in the direction of the winding axis and are wound about the winding core, and the non-coating portion of the positive electrode plate and the non-coating portion of the negative electrode plate are separately fixed to the thin-plate-shaped members.

5. The battery according to claim 1, wherein the thin-plate-shaped member is attached without protruding in a direction of a normal to an outer peripheral face of the winding core from the outer peripheral face.

6. The battery according to claim 3, wherein the current collector, the non-coating portion, and the thin-plate-shaped member are fixed while the non-coating portion is sandwiched between the current collector and the thin-plate-shaped member.

7. The battery according to claim 6, wherein the non-coating portion is fixed to the thin-plate-shaped member while pinching the thin-plate-shaped member from opposite sides of the thin-plate-shaped member, and the current collector is attached to only one side of the non-coating portion pinching the thin-plate-shaped member from the opposite sides.

8. A method of manufacturing a battery including a power generating element having a flattened shape and housed in a container, the power generating element including a positive electrode plate and a negative electrode plate, which are wound with a separator sandwiched therebetween about a winding core having flexibility, the method comprising:

attaching a thin-plate-shaped member having higher rigidity than the winding core to at least one of opposite end portions in a direction of a winding axis of the winding core;

winding the positive electrode plate and the negative electrode plate, with the separator sandwiched therebetween, about the winding core attached with the thin-plate-shaped member;

pressing, together with the winding core and the thin-plate-shaped member, the positive electrode plate and the negative electrode plate, which are wound about the winding core, in a direction orthogonal to the direction of the winding axis into a flattened shape, wherein after the pressing step, the winding core includes, in its sectional view cut along a line perpendicular to the winding axis of the winding core, a flat portion and bent portions, the thin-plate-shaped member includes, in its sectional view cut along the line perpendicular to the winding axis of the winding core, a flat portion and bent portions, and the thin-plate-shaped member is attached at least to the bent portion;

providing a current collector outside the power generating element, the current collector comprising a first plate and a second plate, a cross-section of the first and second plates, taken along the winding axis, being an L-shape, the current collector further comprising a connection plate which is perpendicularly attached to the second plate such that the connection plate of the current collector is in parallel to the flat portion of the thin-plate-shaped member and the flat portion of the power generating element;

attaching the first plate to an electrode terminal; and sandwiching a portion of the flat portion of the power generating element between the connection plate of the current collector and the flat portion of the thin-plate-shaped member.

9. The method of manufacturing the battery according to claim 8, wherein the thin-plate-shaped member is attached to the winding core without protruding in a direction of a normal to an outer peripheral face of the winding core from the outer peripheral face.

10. The battery according to claim 3, wherein the thin-plate-shaped member is positioned with respect to the non-coating portion to which the thin-plate-shaped member is fixed such that the thin-plate-shaped member does not protrude from the non-coating portion toward a center in the direction of the winding axis of the winding core.

11. The battery according to claim 1, wherein the electrode terminal is a bolt and an axis of the bolt is perpendicular to the winding axis of the winding core.

12. The battery according to claim 1, wherein an end portion of thin-plate-shaped member in the direction of the winding axis of the winding core is inserted into the end portion of the winding core, and the thin-plate-shaped member does not protrude in a direction of a normal to an outer peripheral face of the winding core from the outer peripheral face.

13. The battery according to claim 1, wherein the thin-plate-shaped member is attached to an entire circumference of an axial end portion of the winding core.

14. The battery according to claim 3, wherein the portion of the flat portion of the power generating element is sandwiched between the connection plate of the current collector and the non-coating portion of the flat portion of the thin-plate-shaped member.

15. The battery according to claim 14, wherein the portion of the flat portion of the power generating element, the connection plate of the current collector, and the non-coating portion of the flat portion of the thin-plate-shaped member are welded together.

* * * * *